Nov. 29, 1966 L. A. MORTENSEN 3,288,014
FASTENING DEVICE
Filed Sept. 15, 1964
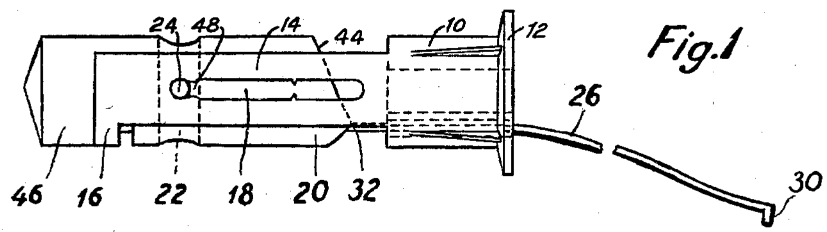
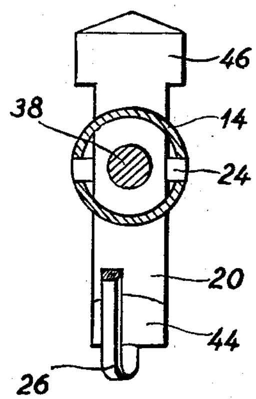
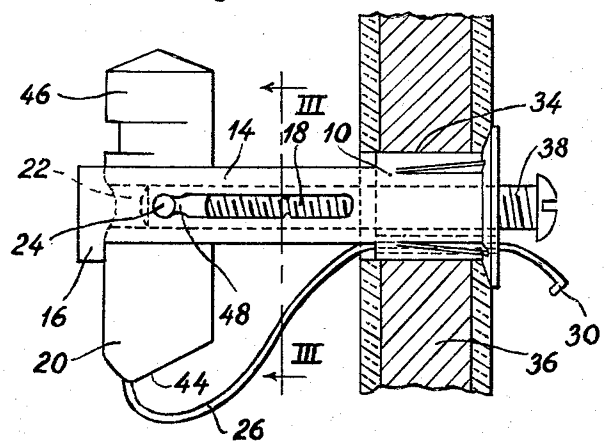
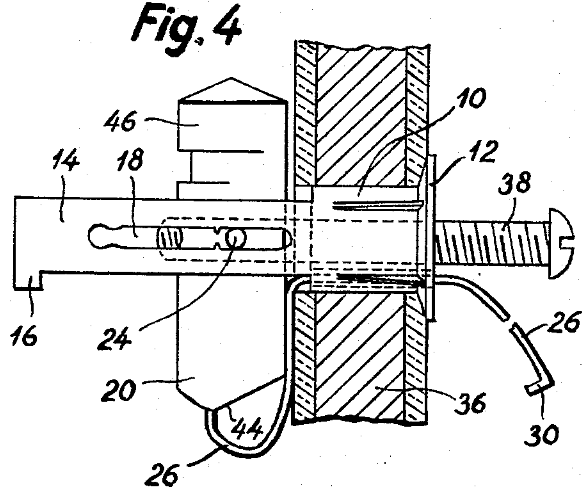
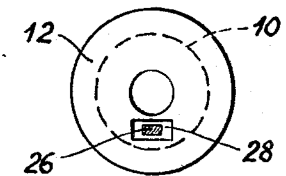
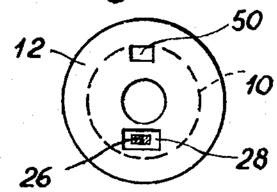

United States Patent Office 3,288,014
Patented Nov. 29, 1966

3,288,014
FASTENING DEVICE

Louis Aackersberg Mortensen, Skodsborg, Denmark (35 Kongevej, Birkerod, Denmark)

Filed Sept. 15, 1964, Ser. No. 396,561
Claims priority, application Denmark, Feb. 24, 1964, 900/64
7 Claims. (Cl. 85—3)

This invention relates to a fastening device intended for use in cases when by means of a screw an object is to be fastened to a relatively thin plate or wall, the rear of which is inaccessible. The invention is particularly useful in connection with light, hollow, partitions comprising two plates which are held mutually spaced by means of a framework.

The present fastening device is of the type consisting of a nipple having at one end a flange and at the other end one or more projections for supporting an oblong body having a transverse threaded bore and being rotatable about an axis perpendicular to the axis of the nipple, and being displaceable towards the nipple for abutment against the rear of the plate in which the nipple is to be fastened.

During the insertion of the fastening device in the hole in the plate in which it is to be arranged, the oblong body assumes a position parallel to the axis of the nipple hereby enabling this insertion. Then the oblong body is to be tilted 90° in order that the transverse threaded bore may assume the right position to receive a screw being passed through the nipple, and by means of which the device is secured to the wall. The securing is effected thereby that the oblong body by continued screwing of the screw in the threaded bore will abut against the rear of the wall.

If it is desired to remove this device again after having inserted the fastening device in the hole of the wall and possibly after having secured said fastening device finally, this appears to be impossible or in any case involving great difficulties because it is not possible to bring the oblong body back to the position in which it is parallel to the axis of the nipple. The object of the present invention is in particular to provide a means for bringing back the oblong body.

This object is according to the invention obtained thereby that to one end of the oblong body a drawing means is secured, said drawing means projecting through a passage to the outer side of the nipple, and being so stiff that by means of said drawing means a pressure may be transmitted to the oblong body.

In order that the backwards movement of the oblong body may take place reliably, the attachment point for the drawing means is according to the invention off-set in relation to the axis of the oblong body.

The passage for the drawing means may have the shape of a through-hole in the nipple. The drawing means preferably has an oblong cross-section, the long axis of which being parallel to the tilting axis of the oblong body. Hereby a comparatively easily bendable, but yet sufficiently stiff drawing means is obtained.

In order that it will be easy to get hold of the free end of the drawing means lying outside the nipple, at this end a perpendicularly projecting projection being able to pass through the hole for the drawing means in the nipple may be provided.

According to a further feature of the invention the oblong body and the drawing means may be formed in one piece of plastic material, which renders a very economical production possible, e.g. by pressure die-casting.

If the oblong body just as in a known fastening device is supported by two fingers with slots, said fingers projecting backwards from the nipple, in which slots pins defining the tilting axis of the rotatable body are displaceable, the slots may according to the invention be formed in such a way that not far from their rear end they are narrowed in order to resist to the displacement of the pins from the end position. Hereby the effect is obtained that when pulling the drawing means the oblong body will be tilted before it is displaced, which is of importance because in this case its ends will not be able to knock against stationary parts during the tilting.

An embodiment of the present fastening device will now be further explained with reference to the drawings, in which FIG. 1 shows a side view of the fastening device in its starting position, FIG. 2 the fastening device arranged in a hole in a wall, after its oblong body having been tilted 90° and ready to be led towards the rear of the wall, FIG. 3 a cross-section taken along the line III—III in FIG. 2 and seen in the direction indicated by arrows, FIG. 4 a side view of the fastening device after the oblong body having been moved towards the rear of the wall, FIG. 5 a front view of the fastening device showing the passage for its drawing means, and FIG. 6 another embodiment having two passages in the nipple.

The fastening device comprises a nipple 10, at one end being provided with a flange 12. At the other end of the nipple there are two projecting parallel fingers 14 which in cross-section are curved as a cylinder surface, having the same diameter as the outside of the nipple, vide FIG. 3. At their free ends these fingers are interconnected by means of an arcuate bridge 16, also lying on said cylinder surface. At the centre of each finger a longitudinal slot 18 is provided.

Between the fingers 14 and oblong body 20 is arranged, said body having approximately at its centre a transverse threaded bore 22. On a level with said bore and perpendicular to its axis projecting, coaxial pins 24 are arranged at the sides of the body 20, said pins extending through the slots 18, and having their ends flushing with the outside of the fingers 14. The embodiment of the fastening device as far as described above is known.

According to the invention a drawing means 26 is secured to one end of the oblong body 20, said drawing means being passed through ap assage 28 in the nipple 10 to the outside of said nipple, vide FIG. 5.

If the main parts of the fastening device, viz. the nipple 10 and the body 20, or only the latter consist of plastic material, the same material is preferably used for the drawing means 26, as said drawing means may then be formed in one piece with the body 20, e.g. by pressure die-casting.

By the shown embodiment the drawing means 26 is formed as a narrow band having a rectangular cross-section, the free end of said band ending by a perpendicularly projecting projection 30. The long axis of the cross-section is parallel to the tilting axis of the body 20. The point 32, where the band is secured to the body 20, is offset in relation to the axis of this body.

As will be seen in FIG. 5 the passage 28 has the shape of a through-hole between the inner and outer cylindrical surfaces of the nipple, nearest to the latter. The height of the hole is a little greater than the width of the band 26, and therefore the band may be pushed through the passage, even when it is turned 90° about its axis in relation to the shown position. The width of the hole is so great that the projection 30 may then pass through the hole. It is hereby permitted that the oblong body 20 and the band may be formed in one piece.

When the fastening device is to be used, the oblong body 20 is in the position shown in FIG. 1, and the device is passed through a hole 34 drilled in advance in the wall 36, to which it is desired to fasten some object. Then the body 20 is tilted to the position shown in FIG. 2, as from the outer side of the nipple the band 26 is pushed inwards. Now a screw 38 is passed through the nipple 10 and the end of the screw is screwed into the threaded bore 22, whereby the screw and the body 20 are engaged, vide FIG. 2. Then the screw 38 is drawn outwards till the body 20 abuts the rear of the wall 36, vide FIG. 4.

When it is desired to secure some object to the wall, the screw 38 is again screwed out and passed through a hole or an opening in the said object, and the end of the screw is again screwed into the oblong body, which now by screwing in the screw gets a fixed abutment against the rear of the wall, the flange 12 of the nipple being simultaneously pressed towards the front of the wall, so that the fastening device will be immovably secured simultaneously with said object being hung on the wall.

At one end the body 20 has an inclined surface 44 in order that this body if desired may be brought in its operative position thereby that the end of the screw 38 is pressed against this surface.

If it is desired to dismount the fastening device, the screw 38 is screwed out, whereafter it is pushed backwards without screwing, so that the oblong body 20 is moved backwards to the position shown in FIG. 2. Then the projection 30 secures that the end of the band 26 does not disappear in the passage 28. Even if the projection abuts the front of the flange 12, it is easy to grip it with the nails. By pulling the band 26 the body 20 may then be tilted back to the position shown in FIG. 1, and the whole device may now be taken out of the hole 34 in the wall. During the dismounting it is desirable that the backwards tilting of the body 20 takes place before any displacement of its towards the nipple 10 occurs, as a head 46 on this body, if there is such a head, will otherwise strike the end of the fingers 14 thereby preventing the desired tilting. Such hindrance for the tilting of the oblong body is eliminated thereby that the slots 18 have a narrowing 48 immediately adjacent the pins 24, vide FIG. 2.

By the embodiment shown in FIG. 6 a passage 50 is made diametrically opposite the hole 28 in the nipple 10 at the outer surface of the latter, said passage continuing in a hole in the flange 12 of the nipple. The passage 50 serves as a further security. If the band 26 by a rough handling might be ruptured, a wire may be passed through the passage 50, and by means of said wire the oblong body 20 may be tilted back to the position shown in FIG. 1.

The invention is not limited to concern the shown embodiment. Thus the drawing means e.g. may be formed of a resilient band, which need not consist of plastic material. Then the end of the band is cast in the oblong body, or the end is pressed into a hole in this body. Furthermore, the attachment point 32 of the drawing means may be placed on the axis of the obling body. It may then be necessary to utilize a bending tension in the drawing means in order to get the oblong body away from the inoperative position.

What I claim is:

1. A fastening device comprising a nipple having at one end an abutment shoulder and at the other end two parallel projecting fingers each defining a longitudinal guide track in opposite portions of said fingers, an oblong member being mounted between said fingers and having oppositely projecting guiding means defining perpendcular to the axis of said nipple a transverse pivot axis for said oblong member, said guiding means being slidably received in said tracks to retain said oblong member between said fingers for pivotal movement between a first position in which said oblong member is approximately aligned with said nipple axis and a second position in which said oblong member extends transversely of said nipple axis and projects laterally of said fingers, said oblong member having a transverse threaded bore which is aligned with the axis of said nipple when said oblong member is in said transverse position and is engageable by leading a threaded screw through the bore of said nipple by means of which screw the oblong member from said second position may be given a translatory movement towards said abutment shoulder and lengthwise of said fingers to a third position, each of said slots having first and second restricted portions, the transverse dimensions of which are slightly less than the transverse dimension of said guiding means, said first restricted portions being disposed intermediate the ends of the tracks and preventing the oblong body from moving back from its third towards its second position in response to the pressure normally applied by screwing another screw into the threaded bore of said oblong member after unscrewing the first mentioned screw, and said second restricted portions being disposed in juxtaposition to the ends of the tracks remote from said abutment shoulder and preventing sliding of said guiding means when said oblong member is pivotally moved from its first to its second position, the improvement comprising a passage through the wall of the nipple, and a drawing means one end of which is secured to the oblong member at a point transversely spaced from said pivot axis when said oblong member is in its second position, the other, free end of said drawing means extending through said passage, whereby said oblong member may be pivotally moved from its second to its first position by gripping and drawing said free end of the drawing means.

2. The fastening device according to claim 1, wherein the securing point for said drawing means is transversely spaced from said pivot axis when the oblong member is in its first position, the drawing member being sufficiently stiff that by pushing said drawing member the oblong member may be pivotally moved from its first to its second position.

3. The fastening device according to claim 1, wherein the free end of said drawing means comprises a terminating end extending substantially perpendicular to the adjacent part of said drawing means, said passage through the wall of the nipple having a substantially rectangular cross section, the width of which is greater than the length of said terminating end which extends substantially transversely to said passage cross section, the height of the passage cross section being larger than the width of said free end of the drawing means but smaller than the length of said terminating end, whereby said free end of the drawing means may be led through said passage by twisting the drawing means approximately 90°, and when released said terminating end will prevent withdrawing of the drawing means from said passage.

4. The fastening device according to claim 3, wherein the oblong member and the drawing means are formed integrally and of plastic material.

5. A fastening device comprising a nipple having a passage through its wall and at one end an abutment shoulder, at the other end two parallel projecting fingers each having therein a longitudinal slot closed at both ends, an oblong member between said fingers and having at its midsection oppositely projecting trunnions rotatably and slidably received in said slots to retain said oblong member rotatably between said fingers for pivotal movement about an axis perpendicular to the axis of said nipple between a first position in which said oblong member is approximately aligned with said nipple axis and a second position in which said oblong member extends transversely of said nipple axis and projects laterally to both sides of said fingers and for translatory movement lengthwise of said fingers when said oblong member is in said transverse position, said oblong member having a transverse threaded bore which is aligned with the axis of said nipple when said oblong member is in its transverse position and is engageable by a threaded screw when said oblong member is in said transverse position to draw said oblong member toward said abutment shoulder to a third position and each of said slots has first and second narrowed parts the widths of which are slightly smaller than the diameter of said trunnions, said first narrowed parts being disposed intermediate the ends of said slots and preventing sliding of said trunnions from a position corresponding to the third position of said oblong member towards a position corresponding to the second position of the oblong member in response to the pressure normally applied by screwing another screw into the threaded bore after unscrewing the first mentioned screw and said second narrowed parts being disposed in juxtaposition to the ends of said slots remote from said abutment shoulder and preventing sliding of said trunnions when said oblong member is pivotally move from its first to its second position, and drawing means one end of which is secured to the oblong member at a point transversely spaced from said pivot axis when said oblong member is in its second position, the other free end of said drawing means extending through said passage, whereby said oblong member may be pivotally moved from its first to its second position by gripping and drawing said free end of the drawing means.

6. The fastening device improvement of claim 5, wherein the free end of said drawing means comprises a terminating end extending substantially perpendicular to the adjacent part of said drawing means, said passage through the wall of the nipple having a substantially rectangular cross section, the width of which is greater than the width of said terminating end which extends substantially transversely to said passage cross section, the height of the passage cross section being larger than the height of said free end of the drawing means but smaller than the length of said terminating end, whereby said free end of the drawing means may be led through said passage by twisting the drawing means approximately 90°, and when released said terminating end will prevent withdrawing of the drawing means from said passage.

7. The fastening device improvement of claim 6, wherein the oblong member and the drawing means are formed integrally and of plastic material.

References Cited by the Examiner

UNITED STATES PATENTS

| | | | |
|---|---|---|---|
| 1,269,912 | 6/1918 | Dunham | 85—3 |
| 2,609,723 | 9/1952 | Stubbs. | |
| 3,248,994 | 5/1966 | Mortensen | 85—3 |

FOREIGN PATENTS

| | | |
|---|---|---|
| 251,754 | 5/1926 | Great Britain. |

CARL W. TOMLIN, *Primary Examiner.*

EDWARD C. ALLEN, *Examiner.*

RAMON S. BRITTS, *Assistant Examiner.*